United States Patent [19]

Manlove et al.

[11] Patent Number: 5,261,004
[45] Date of Patent: Nov. 9, 1993

[54] NOISE BLANKING CIRCUIT FOR AM STERO

[75] Inventors: Gregory J. Manlove; Jeffrey J. Marrah; Richard A. Kennedy, all of Kokomo; Mark A. Kady, Greentown; Marvin G. Stang, Flora, all of Ind.

[73] Assignee: Delco Electronics Corporation, Kokomo, Id.

[21] Appl. No.: 808,829

[22] Filed: Dec. 17, 1991

[51] Int. Cl.5 .......................... H04H 5/00; H04B 1/00
[52] U.S. Cl. ......................................... 381/15; 381/13;
455/223
[58] Field of Search ............................. 381/15, 16, 13;
455/223, 303, 306, 219, 225

[56] References Cited

U.S. PATENT DOCUMENTS

| | | | |
|---|---|---|---|
| 4,498,195 | 2/1985 | Ooi et al. | 455/303 |
| 4,510,624 | 4/1985 | Thompson et al. | 455/223 |
| 4,637,066 | 1/1987 | Kennedy et al. | 455/223 |
| 4,680,793 | 7/1987 | Sugai et al. | 455/223 |
| 5,014,316 | 5/1991 | Marrah et al. | 381/15 |

FOREIGN PATENT DOCUMENTS

| | | | |
|---|---|---|---|
| 0066312 | 6/1978 | Japan | 455/223 |
| 0009143 | 1/1982 | Japan | 381/15 |
| 0176930 | 10/1984 | Japan | 381/13 |

Primary Examiner—Jin F. Ng
Assistant Examiner—P. W. Lee
Attorney, Agent, or Firm—Anthony Luke Simon

[57] ABSTRACT

An AM stereo input signal is processed by an envelope detector, an in-phase detector and a quadrature phase detector to yield outputs which may carry short noise impulses. Each output is low pass filtered to derive an average signal level and each output is ratiometrically compared to the corresponding average to detect a tic or modulation substantially above the average. In response to a tic a hold circuit generates a flag for a period which depends on the quality of the input signal. A dual mode deemphasis and sample/hold circuit normally filters the audio signal in each channel and is effective for the duration of the flag to hold the existing signal in the circuit to blank out the noise impulse.

8 Claims, 4 Drawing Sheets

NOISE BLANKING CIRCUIT FOR AM STERO

FIELD OF THE INVENTION

This invention relates to noise blanking circuits and particularly to such circuits for AM stereo.

BACKGROUND OF THE INVENTION

It is desirable to eliminate noise from AM radio signals to avoid distracting sounds in the audio broadcast. Automotive radios are particularly susceptible to noises because of their proximity to the engine ignition system, which generously emanates radio signals. The spark of the ignition system often creates a very short duration impulse or spike known as a tic, which is very disconcerting to the listener. It is already known to eliminate the tic by detecting its occurrence and blanking the noise by preventing radio signal passage to the speakers for the duration of the tic, which is typically less than 250 microseconds. Because this particular type of noise has such a short duration, the interruption of the signal is not noticeable if that period is filled with an approximation of the correct signal. There are two critical aspects of such noise blanking: correctly and efficiently detecting the impulse noise, and removing the noise in the optimal manner.

An example of a prior circuit which blanks short duration pulses is shown in U.S. Pat. No. 4,637,066 to Kennedy et al which is conceptually like FIG. 1 herein. An input signal received at an antenna 110 is converted into an IF signal in a front end circuit 112 and is amplified in the IF amplifier 114. The signal is AM detected at the detector 116 to generate the AM mono audio signal. The low pass filter 118 averages the detected signal and presents the average value to the comparator 122. The non-averaged signal is reduced by an attenuator 120 and compared to the average. The comparator generates an output or flag when the attenuated noise spike rises above the average. If the noise is not of short duration, the average signal will soon increase so the difference will decrease and the flag will disappear. When the flag is enabled, the audio signal path is switched off with a switch 128 and a capacitor 124 holds the output constant, thereby suppressing the tic. There is a delay stage 126 incorporated into the signal path. This is needed to synchronize the tic detection circuitry and the signal path. Since it takes a finite time to detect the presence of a tic, the signal path must be delayed to assure the signal is being held at the correct instant in time. This circuit works well for the simplified mono system. There is no processing of the audio signal so the hold time does not have to be varied, and there are no additional signals like those available in AM stereo circuits which can be used as flags. The complexity of the AM stereo system provides more flags for tic detection and requires a more sophisticated hold method.

Once a tic is detected, there must be a way to remove it from the audio signal. It is already known to use a sample and hold circuit to interrupt the audio signal and hold it constant during the period of the tic. For example, there is a sample and hold (S/H) circuit at the deemphasis stage in the FM stereo which has been disclosed in the U.S. Pat. No. 4,975,953 to Kennedy et al entitled "Combined Deemphasis Circuit and Noise Blanker". This placement of the S/H circuit has been carried over into the AM stereo system disclosed herein although there are different reasons for such placement. In the FM case, the input signal has 38 kHz information riding on it, and this will affect the held data. The deemphasis attenuates this information, so it is the ideal place to hold the signal. In the AM system, there is no unrelated high frequency information. The hold is made at the deemphasis to realize the required delay time in the signal path. In both systems, the hold cannot be placed after the deemphasis, because the signal will be narrow band and the impulse will e stretched.

SUMMARY OF THE INVENTION

It is therefore an object of the invention to provide a noise reduction circuit to an AM stereo radio for eliminating short duration impulse noises. One aspect of this object is to efficiently detect such noise using all the available signals, another aspect is to make the noise reduction in a deemphasis circuit with no significant addition to the circuit, and another aspect is to vary the hold time dependent on the signal processing conditions.

The invention is carried out in an AM stereo radio circuit having a noise canceling circuit comprising: an AM stereo decoder responsive to incoming signals for producing right and left channel signals and having detector means for generating an envelope signal, an in-phase signal and a quadrature phase signal; a flag generating circuit responsive to the envelope signal, the in-phase signal and the quadrature phase signal for detecting a short duration noise pulse and generating a flag for the duration of the noise, the flag generating circuit comprising means responsive to the envelope signal for comparing the average envelope amplitude to an attenuated value of the envelope signal to generate a first tic signal, means responsive to the in-phase signal for producing first and second reference signals each having an amplitude proportional to the carrier amplitude and greater than 100% modulation values of the respective quadrature and in-phase signals, and means for comparing the quadrature and in-phase signals with the respective first and second reference signals to generate additional tic signals, and means responsive to the tic signals for generating a flag when any tic signal occurs; and a deemphasis and sample and hold circuit means in the decoder for processing right and left channel signals and responsive to the tic flag for sampling and holding the said channel signals for the duration of the flag signal to cancel noise.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The following is a description of a modification of a known receiver which decodes compatible quadrature amplitude modulation. An example of this known receiver is disclosed in the U.S. Pat. No. 5,014,316 to Marrah et al entitled "Compatible Quadrature Amplitude Modulation Detector System" which discloses the decoder block diagram. In that patent no mention is made of eliminating the tic problem in AM stereo receivers; thus, the combined deemphasis sample and hold (S/H) circuitry and the tic detection circuitry are new additions to the previous block diagram.

Figure 2:
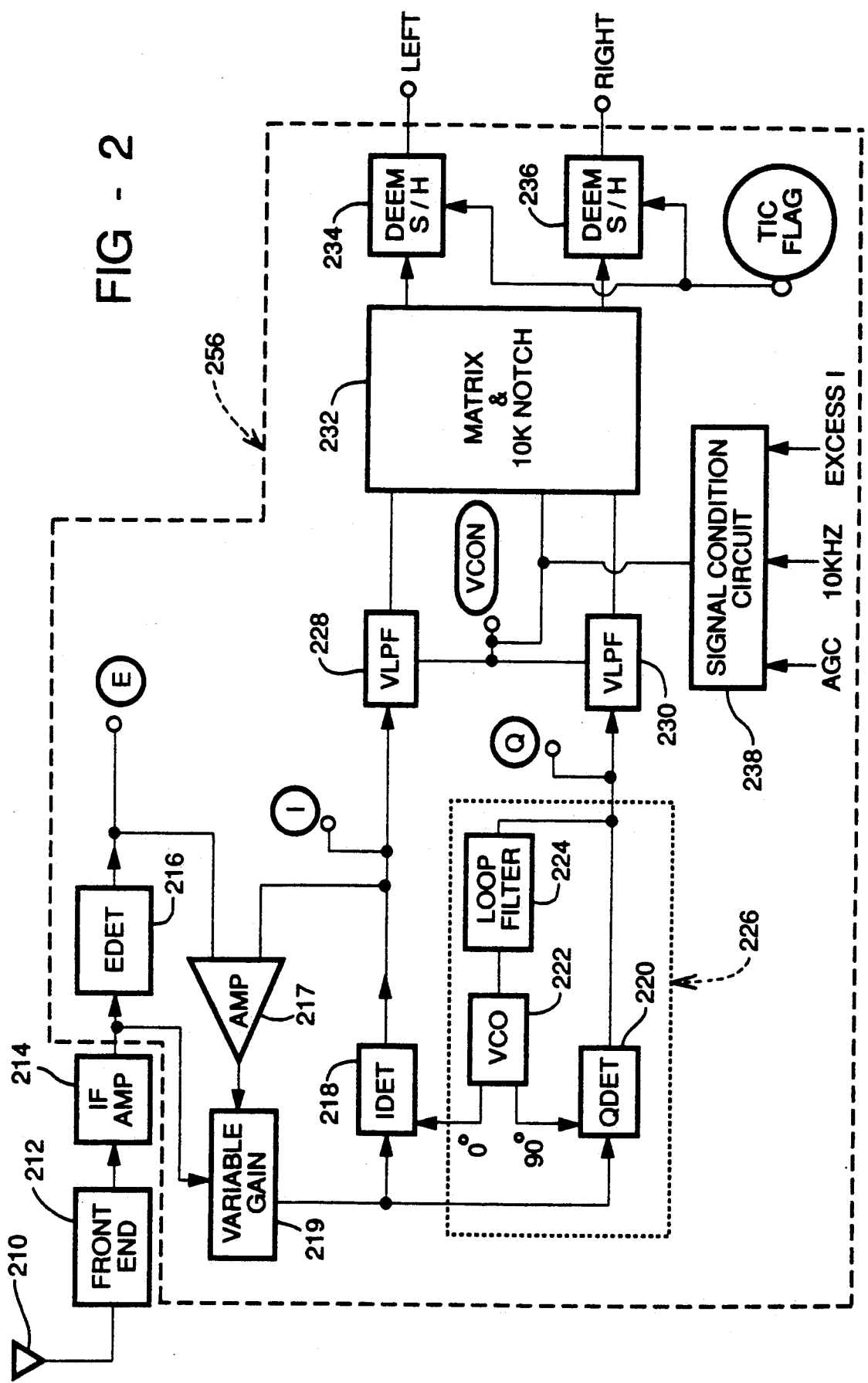
FIG. 2 is a block diagram of an AM stereo receiver with particular attention to the stereo demodulator and noise reduction circuitry for incorporation of the invention.

Referring to FIG. 2, an input signal received at an antenna 210 is converted into an IF signal in a front end circuit 212 and is amplified in the IF amplifier 214. The input of the AM stereo decoder 256 is an IF signal modulated by compatible quadrature amplitude modulation. This signal is coupled to an envelope detector (EDET) 216, whose output of $1+L+R$ (labeled E) is coupled to an amplifier 217. The EDET 216 is a standard AM detector. The IF signal is also coupled to a variable gain circuit 219 which also receives a control signal from the amplifier 217. The corrected output of the gain circuit 219 is coupled to an in-phase detector (IDET) 218 and a quadrature phase detector (QDET) 220. The QDET acts as a phase detector in the phase-locked loop (PLL) 226. The QDET output is coupled to a loop filter 224 in the PLL. The output of the loop filter is coupled to the voltage controlled oscillator (VCO) 222. The PLL is comprised of the phase detector, loop filter and VCO. The IDET 218 and QDET 220 are synchronous detectors and receive in-phase (0°) and quadrature (90°) second inputs, respectively, from the VCO 222. Lacking any signal correction, the output signals from the IDET and QDET would be $(1+L+R)$ COS $\delta$ and $(L-R)$ COS $\delta$, labeled I and Q, respectively.

The output of the IDET is coupled to the amplifier 217 where the difference between the I output and the E output is amplified and sent to the variable gain stage 219. For normal modulation this feedback circuit forces the corrected I output to be equal to the E output of $(1+L+R)$. This forces the variable gain stage 219 to have a gain of $1/\text{COS } \delta$. The output of the variable gain stage is also coupled to the QDET circuit 220. This forces the output of the QDET to be equal to $L-R$. The outputs of the QDET and IDET circuits are coupled to variable low pass filters (VLPF) 230 and 228 respectively. The variable low pass filters are controlled by a signal condition voltage VCON. This condition voltage is generated in the signal condition circuit 238, and is affected by various signals which indicate the quality of the incoming signal. For example, the AGC voltage of the radio impacts the control voltage and is an indication of the RF signal strength. If the AGC voltage is high, the incoming signal is weak and VCON is low, this reduces the bandwidth of the low pass filters. The output of the VLPF's are sent to the combination matrix and variable 10 kHz notch circuit 232 whose output is sent to the combination deemphasis and S/H circuits 234 and 236. The outputs of the deemphasis and S/H circuits are "left" and "right", respectively.

The deemphasis and S/H circuits 234 and 236 are last in the signal path. This gives the tic flag circuit enough time to detect the presence of a tic. If the variable low pass filter is in its widest mode (9 kHz) there is a minimum required delay of 60 microseconds, and little stretching of the tic pulse. If the variable low pass filter is in its narrowest mode (1.5 kHz), the delay is approximately the same, but the tic has been stretched, and a longer hold time is required. The deemphasis stage adds additional band limiting and stretches the tic even more, this is why the optimal point for holding the signal is internal to this deemphasis circuit. The output capacitor required in each deemphasis circuit can act as the band limiting element in the deemphasis under normal operating conditions, and as the hold element for tic suppression when a tic has been detected.

Figure 4A:
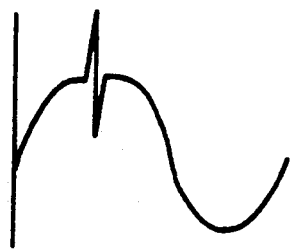
FIGS. 4A through 4E are a series of waveforms either exhibiting a tic or with the tic suppressed.
Figure 4B:
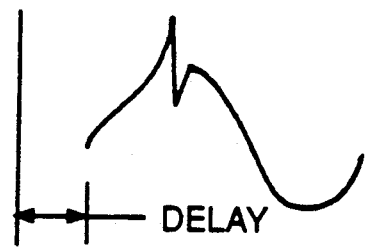
Figure 4C:
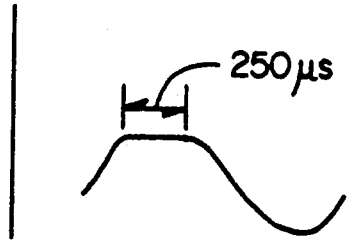
Figure 4D:
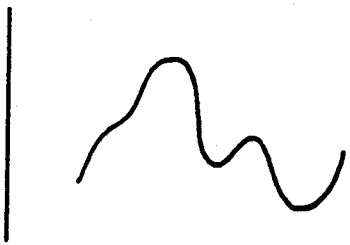
Figure 4E:
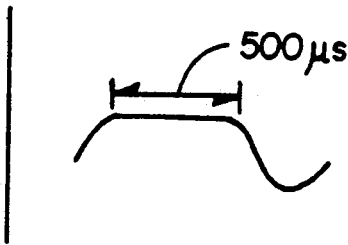

FIGS. 4A through 4E contain waveforms of a signal with a tic at various points in the signal path and under various processing conditions. In FIG. 4A, a signal with a tic at the input to the IC is shown; FIG. 4B shows the signal at the input to the deemphasis S/H when the input to the IC is the signal of FIG. 4A and the VLPF is in its wide mode. As can be seen, the waveform is essentially the same but it has been delayed by the necessary 60 microseconds. This is enough time for the flag circuitry to detect a tic. FIG. 4C shows the output of the deemphasis S/H circuit when the tic flag circuit has detected a disturbance. The output is held for 250 microseconds, after which time the tic is no longer present. FIGS. 4D and 4E show waveforms of the deemphasis S/H circuit input and output with waveform of FIG. 4A at the input to the IC. The tic has been stretched out due to the narrow band variable filters, and a hold time of 500 microseconds is now required.

Figure 3:
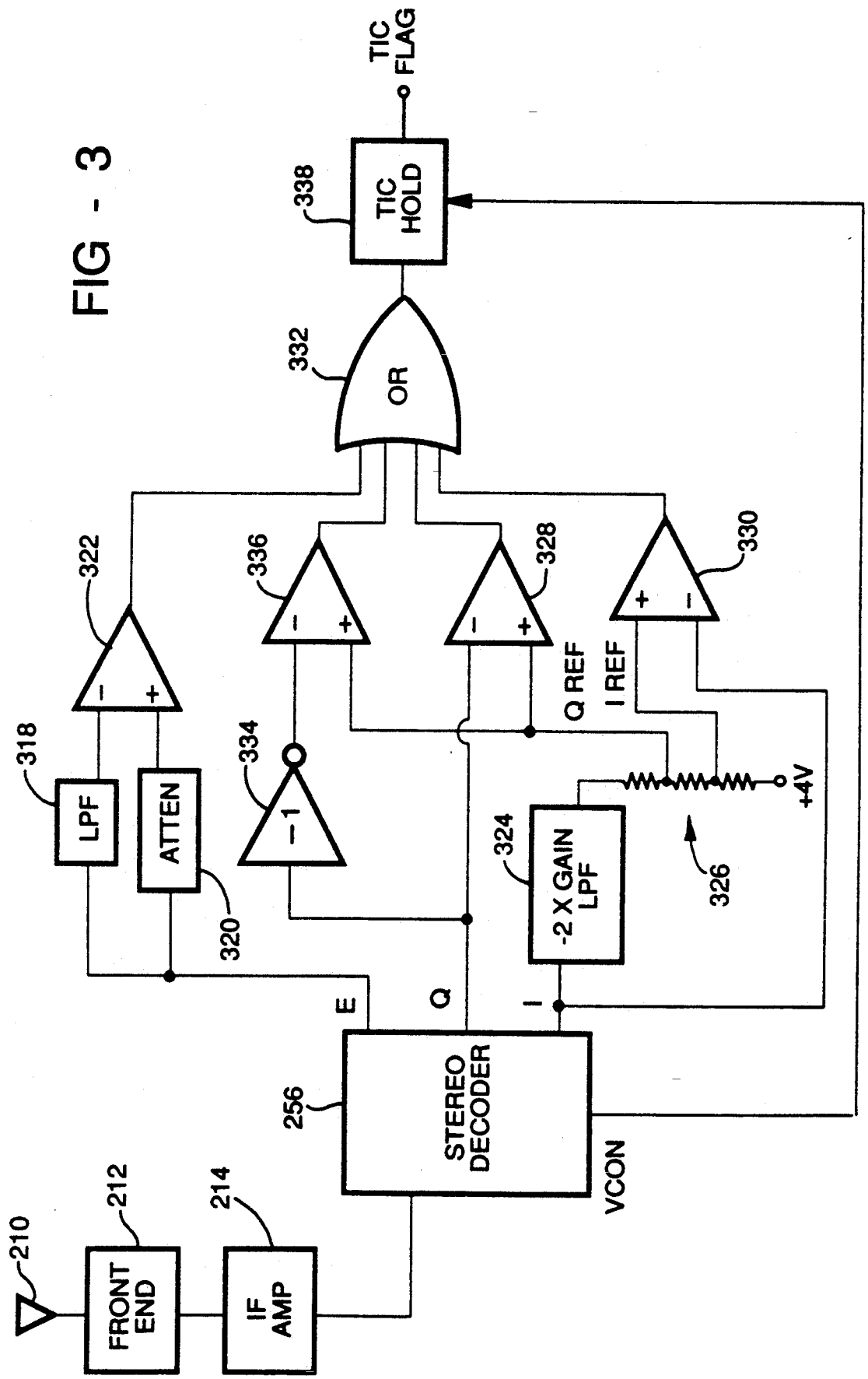
FIG. 3 is block diagram of the noise detection circuitry, according to the invention.

FIG. 3 contains the new tic flag detection circuit which utilizes signals generated by the stereo decoder 256. The output of the EDET, E from FIG. 2, is applied to low pass filter 318 which averages the detected signal and presents the average value to the comparator 322. The non-averaged signal is attenuated and compared to the average. The comparator generates an output or flag when the attenuated noise spike rises above the average. This flag is sent to an OR gate 332. This portion of the tic detection circuitry is the same as that in the above mentioned U.S. Pat. No. 4,637,066.

The output I of the IDET from FIG. 2 is low pass filtered and amplified by negative 2 times. This generates a DC voltage equivalent to a 200 percent signal level. The DC voltage is then divided by a resistor divider 326 to provide reference voltages I-REF and Q-REF respectively proportional to 150 percent excess I negative modulation and 150 percent excess Q modulation. The references for I and Q are different because Q corresponds to $(L-R)$ and I corresponds to $1+(L+R)$. Under normal modulation conditions, both the I and Q signals should not exceed 100 percent; however, if two stations are present on the same band, the signals will add and subtract to create peak modulations well beyond 100 percent. A value of 150 percent has been chosen to minimize the tic suppression under this interference condition, yet still provide a tic detector sensitive enough to minimize the adverse effects of impulse noise. The I and Q signals are compared with the DC references I-REF and Q-REF in comparators 330 and 328 respectively. The DC references are proportional to the I signal, so varying IF signal levels do not impact the performance of the tic detector (because the signals are ratioed). The Q signal, unlike the I signal, can deviate in both the negative and positive directions. A simple embodiment of the circuit with comparators 328 and 330 detects only negative transients. This will catch all the excess I deviations and at least half the excess Q deviations with a minimum of circuitry. To detect all the Q peak modulations beyond 150 percent, a more complete embodiment includes an inverter 334 to invert the Q signal, and another comparator 336 with inverted Q and Q-REF as inputs would be required. All the comparator outputs are sent to an OR gate 332. If any of the comparators 322, 328, 330 or 336 detect the presence of a tic, the output of the OR gate goes high. This signal is input to the tic hold circuit, 338. The tic hold circuit holds the tic flag output high for 250 microseconds as shown in FIG. 4C, if the signal conditions are good. If signal conditions are poor, the variable low pass filters are narrow band and the control voltage is low. The tic hold circuit 338 detects a condition voltage VCON below 2.5 volts and causes the hold time to increase to 500 microseconds as shown in FIG. 4E. The tic hold circuit is implemented using a one shot with two different hold times.

Figure 1:
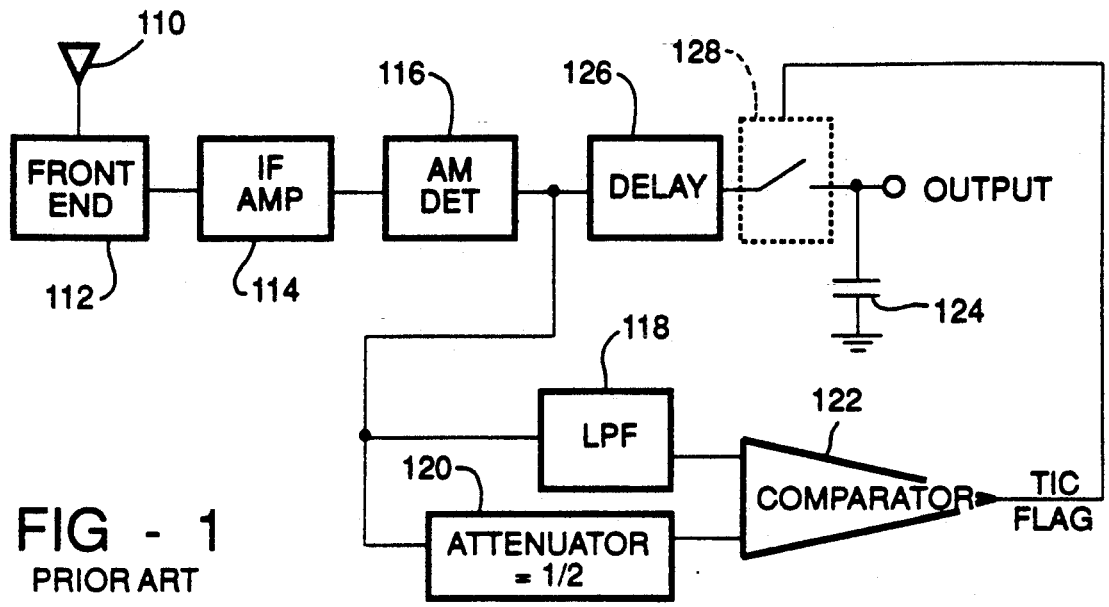
FIG. 1 is a block diagram of a prior art AM noise reduction circuit.
Figure 5:
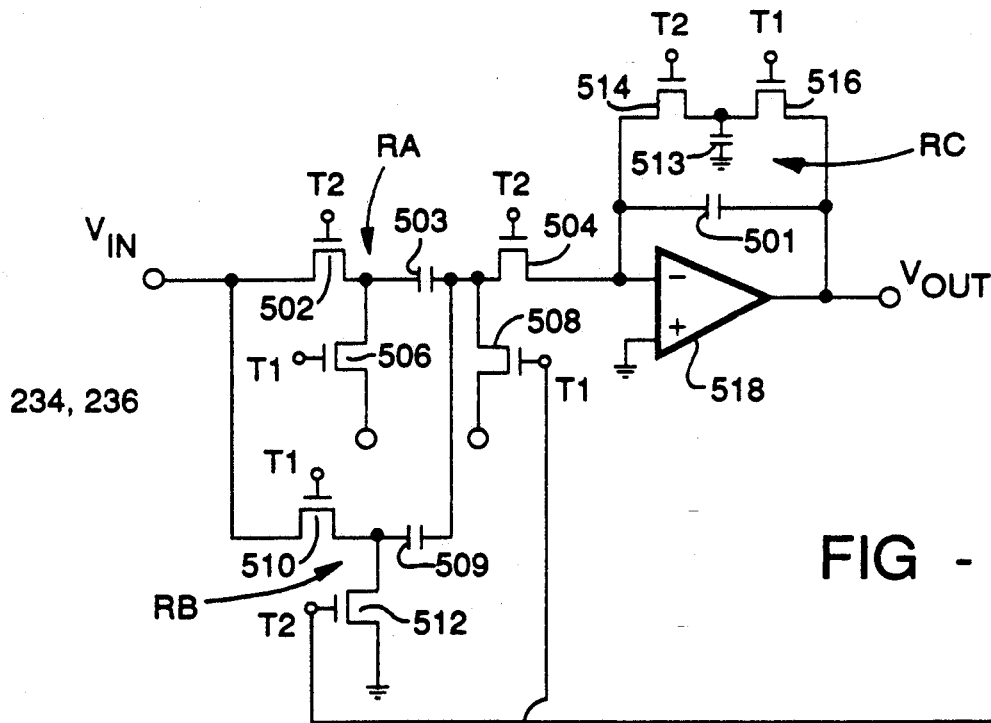
FIG. 5 is a schematic diagram of a dual mode circuit for the deemphasis and sample and hold functions for the circuit of FIG. 2, according to the invention.
Figure 5:
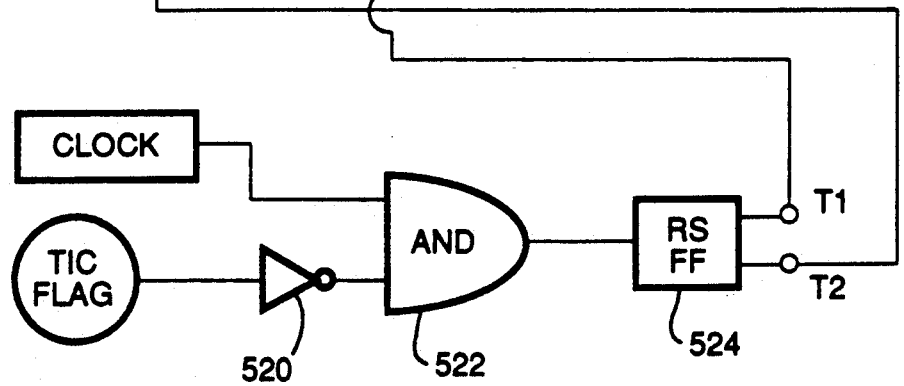

FIG. 5 is a schematic diagram of the dual mode circuit 234, 236 for the deemphasis and S/H functions and is somewhat like a similar circuit disclosed in the above-mentioned U.S. Pat. No. 4,975,953. The circuit is implemented in CMOS using switched capacitor circuitry. As is well known, the switched capacitor design simulates a resistor by a capacitor which is rapidly switched to transfer charge at an average rate. This charge moving at an average rate corresponds to an average current. Thus for any voltage applied, an average current is generated, this corresponds to an equivalent resistance.

The dual mode circuit 234, 236 is made up of a capacitor 501 and three equivalent resistances: RA made up of capacitor 503 and switches 502, 504, 506, and 508; RB made up of capacitor 509 and switches 510, 512, 504 and 508; and RC made up of capacitor 513 and switches 514 and 516. The resistance RC is connected across the capacitor 501 which, in turn, is connected between the output and the negative input terminal of an operational amplifier 518. The tic flag signal generated in the noise detector is coupled to an inverter 520 which in turn is connected to an AND gate 522. The other input to the AND gate is the clock input. The AND gate passes the clock signal when the tic flag is low and stops the clock signal when the tic flag is high. The AND gate output is connected to the input of a RS flip-flop circuit 524 which produces the two phase non-overlapping clock signals T1 and T2. The clock signal T1 is coupled to the gates of switches 506, 508, 510 and 516. The clock signal T2 is coupled to the gates of switches 502, 504, 512 and 514. In FIG. 5, all the switches are CMOS transmission gates. For simplicity, the switches are shown as transistors but, as is well known, transmission gates are generally preferred over transistors for capacitor switching applications.

In the normal operating mode of the circuit 500, the tic flag is low and all the switches are clocked at a constant rate. The switched capacitors represent an equivalent resistance and the filter then exhibits a standard AM deemphasis response. Such a deemphasis filter operation is well known and is not further explained here. The same circuit becomes a sample and hold circuit when the clock signals are stopped when the tic flag goes high. At that moment, the filtering action is suspended until the flag goes low again. The AND gate 522 is coupled into the RS flip-flop 524 to assure that T1 goes high and T2 goes low. This keeps 501 from being updated and removes any storage on capacitor 503. When the clock signals are stopped, the instantaneous filtered signal is held for the duration of the extended flag. Thus the dual mode circuit provides the ideal place for noise reduction. Any position after the filter causes additional pulse stretching of the noise signal requiring a longer hold period, and any position before the filter will not contain the desired delay time. In this circuit the sample and hold is used in place of the filter when the flag is high and thus is neither after or before the filter. When the tic flag goes low, the circuit resumes a standard deemphasis filter function.

It will thus be apparent that the AM stereo circuit modifications proposed herein are effective to detect noise impulses for flag generation and to remove such noise from the audio signal by commanding a sample and hold operation at the correct time and for an appropriate period.

The embodiments of the invention in which an exclusive property or privilege is claimed are defined as follows:

1. An AM stereo radio circuit having a noise canceling circuit comprising:
an AM stereo decoder responsive to incoming signals for producing right and left channel signals and having detector means for generating an envelope signal, and in-phase signal and a quadrature phase signal; a flag generating circuit responsive to the envelope signal, the in-phase signal and the quadrature phase signal for detecting a short duration noise pulse and generating a flag for the duration of the noise, the flag generating circuit comprising means responsive to the envelope signal for averaging the envelope signal to develop an average envelope amplitude, means for comparing the average envelope amplitude to an attenuated value of the envelope signal to generate a first tic signal, means responsive to the in-phase signal for producing first and second reference signals each having an amplitude proportional to the carrier amplitude and greater than 100% modulation values of the respective quadrature and in-phase signals, and means for comparing the quadrative and in-phase signals with the respective first and second reference signals to generate additional tic signals, and means responsive to the first and the additional tic signals for generating a flag when any tic signal occurs; and
a deemphasis and sample and hold circuit means in the decoder, coupled to the means responsive to the tic signals and to the AM stereo decoder, for processing right and left channel signals and responsive to the generated flag for sampling and holding the said channel signals for the duration of the flag signal to cancel noise.

2. The invention as defined in claim 1 wherein the means for producing the first and second reference signals comprises a low pass filter with a negative gain higher than unity and a voltage divider coupled to the filter output for producing the reference signals.

3. The invention as defined in claim 2 wherein the means for producing the first and second reference signals comprises a low pass filter with a gain on the order of negative two and a voltage divider coupled to the filter output for producing the first reference signal having a value on the order of 150% excess quadrature modulation and the second reference signal on the order of 150% excess negative in-phase modulation.

4. The invention as defined in claim 1 wherein the means for comparing the quadrature signal with the first reference signal includes a comparator having the quadrature signal and the first reference signal as inputs.

5. The invention as defined in claim 1 wherein the means for comparing the quadrature signals with the first reference signal includes a first comparator having the quadrature signal and the first reference signal as inputs, means for inverting the quadrature signal, and a second comparator having the inverted quadrature signal and the first reference signal as inputs.

6. The invention as defined in claim 1 wherein the means for comparing the in-phase signal with the second reference signal includes a comparator having the in-phase signal and the second reference signal as inputs.

7. The invention as defined in claim 1 wherein the means for generating a flag comprises a tic hold circuit for producing a flag for a set time when a tic signal occurs.

8. The invention as defined in claim 1 wherein the decoder includes a signal condition circuit which produces a condition voltage representing signal quality, and the means for generating a flag when any tic signal occurs comprises a tic hold circuit responsive to the condition voltage for producing a flag for a first period when the condition voltage is above a given value and for a second period when the condition voltage is below the given value.

* * * * *